(12) United States Patent
Bauer et al.

(10) Patent No.: US 9,193,469 B2
(45) Date of Patent: Nov. 24, 2015

(54) AIRCRAFT ENGINE WITH AN APPARATUS FOR PULSATING EXPIRATION OF GAS INTO THE EXHAUST NOZZLE

(71) Applicant: EADS Deutschland GmbH, Ottobrunn (DE)

(72) Inventors: Michael Bauer, Kirchheim b. Munich (DE); Ludwig Schauwecker, Daisendorf (DE); Daniel Redmann, Grafing b. Munich (DE); Josef Steigenberger, Bad Toelz (DE)

(73) Assignee: AIRBUS DEFENCE AND SPACE GMBH, Ottobrunn (DE)

( * ) Notice: Subject to any disclaimer, the term of this patent is extended or adjusted under 35 U.S.C. 154(b) by 0 days.

(21) Appl. No.: 14/050,437

(22) Filed: Oct. 10, 2013

(65) Prior Publication Data

US 2014/0097271 A1    Apr. 10, 2014

(30) Foreign Application Priority Data

Oct. 10, 2012    (DE) .......................... 10 2012 109 647

(51) Int. Cl.
*F02K 1/34*    (2006.01)

(52) U.S. Cl.
CPC . *B64D 33/06* (2013.01); *F02K 1/34* (2013.01); *F05D 2260/16* (2013.01); *F05D 2260/963* (2013.01)

(58) Field of Classification Search
CPC ............... F02K 1/34; F02K 1/28; F02K 1/30; F02K 1/32; F02K 9/97; F02K 1/60; F02K 1/827; F02K 1/006; F02K 1/08; F02K 1/286; F02K 9/86; F02K 9/974; Y02T 50/671; Y02T 50/675; B64D 33/06; F16J 3/02; F16J 3/00; F15D 1/08
USPC .......... 181/143, 206, 213, 220, 148; 367/175; 239/265.19, 265.23, 127.3; 60/242, 60/771, 770, 264
See application file for complete search history.

(56) References Cited

U.S. PATENT DOCUMENTS

| | | | | |
|---|---|---|---|---|
| 3,575,260 | A * | 4/1971 | Urguhart et al. | 181/216 |
| 5,092,425 | A * | 3/1992 | Shaw, Jr. | 181/213 |
| 5,313,025 | A * | 5/1994 | Roessler et al. | 181/106 |
| 5,432,857 | A * | 7/1995 | Geddes | 381/71.7 |
| 5,758,823 | A * | 6/1998 | Glezer et al. | 239/4 |
| 6,234,751 | B1 * | 5/2001 | Hassan et al. | 416/42 |
| 6,308,898 | B1 | 10/2001 | Dorris, III et al. | |

(Continued)

FOREIGN PATENT DOCUMENTS

| | | |
|---|---|---|
| DE | 60127971 T2 | 1/2008 |
| FR | 1124095 A * | 10/1956 |

OTHER PUBLICATIONS

English Translation of FR1124095.*

*Primary Examiner* — Ehud Gartenberg
*Assistant Examiner* — Jared W Pike
(74) *Attorney, Agent, or Firm* — Leydig, Voit & Mayer, Ltd.

(57) ABSTRACT

An aircraft jet engine includes an exhaust-gas nozzle having a device configured to blow out an exhaust gas in a pulsating manner into an exhaust-gas stream so as to reduce noise. The exhaust-gas nozzle includes openings distributed along a circumference of the exhaust-gas nozzle and disposed upstream from a nozzle outlet. The openings communicate with the device.

8 Claims, 1 Drawing Sheet

(56) References Cited

U.S. PATENT DOCUMENTS

| | | | |
|---|---|---|---|
| 6,375,118 B1 * | 4/2002 | Kibens et al. | 244/53 R |
| 7,055,329 B2 * | 6/2006 | Martens et al. | 60/772 |
| 7,308,966 B2 * | 12/2007 | Gupta | 181/215 |
| 2006/0032988 A1 | 2/2006 | Webster | |
| 2007/0152104 A1 | 7/2007 | Cueman et al. | |
| 2009/0320487 A1 | 12/2009 | Alkislar et al. | |
| 2012/0186224 A1 | 7/2012 | Huber et al. | |

* cited by examiner

AIRCRAFT ENGINE WITH AN APPARATUS FOR PULSATING EXPIRATION OF GAS INTO THE EXHAUST NOZZLE

CROSS-REFERENCE TO PRIOR APPLICATION

Priority is claimed to German Patent Application No. DE 10 2012 109 647.3, filed on Oct. 10, 2012, the entire disclosure of which is hereby incorporated by reference herein.

FIELD

The invention relates to an aircraft jet engine having an exhaust-gas nozzle that comprises devices for blowing out a gas in a pulsating manner into the exhaust-gas stream for purposes of reducing noise.

BACKGROUND

In aircraft jet engines, a considerable portion of the noise is generated when the exhaust-gas stream exiting from the exhaust-gas nozzle at a high velocity mixes with the ambient air or, in the case of fanjet engines, when the primary-gas stream exiting from a gas turbine mixes with the secondary-gas stream accelerated by the fan, and also when the secondary-gas stream mixes with the ambient air. Since the noise increases by a power of about six to eight relative to the velocity of the gas stream, a reduction in the relative velocity between the adjacent interacting gas streams can significantly reduce the level of noise.

U.S. Pat. Appln. No. 2012/0186224 A1 discloses a system for noise reduction in which several outlet openings distributed along the circumference are used to blow out compressed air downstream from the gas outlet nozzle between adjacent, interacting gas streams.

SUMMARY

In an embodiment, the present invention provides an aircraft jet engine including an exhaust-gas nozzle having a device configured to blow out an exhaust gas in a pulsating manner into an exhaust-gas stream so as to reduce noise. The exhaust-gas nozzle includes openings distributed along a circumference of the exhaust-gas nozzle and disposed upstream from a nozzle outlet. The openings communicate with the device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
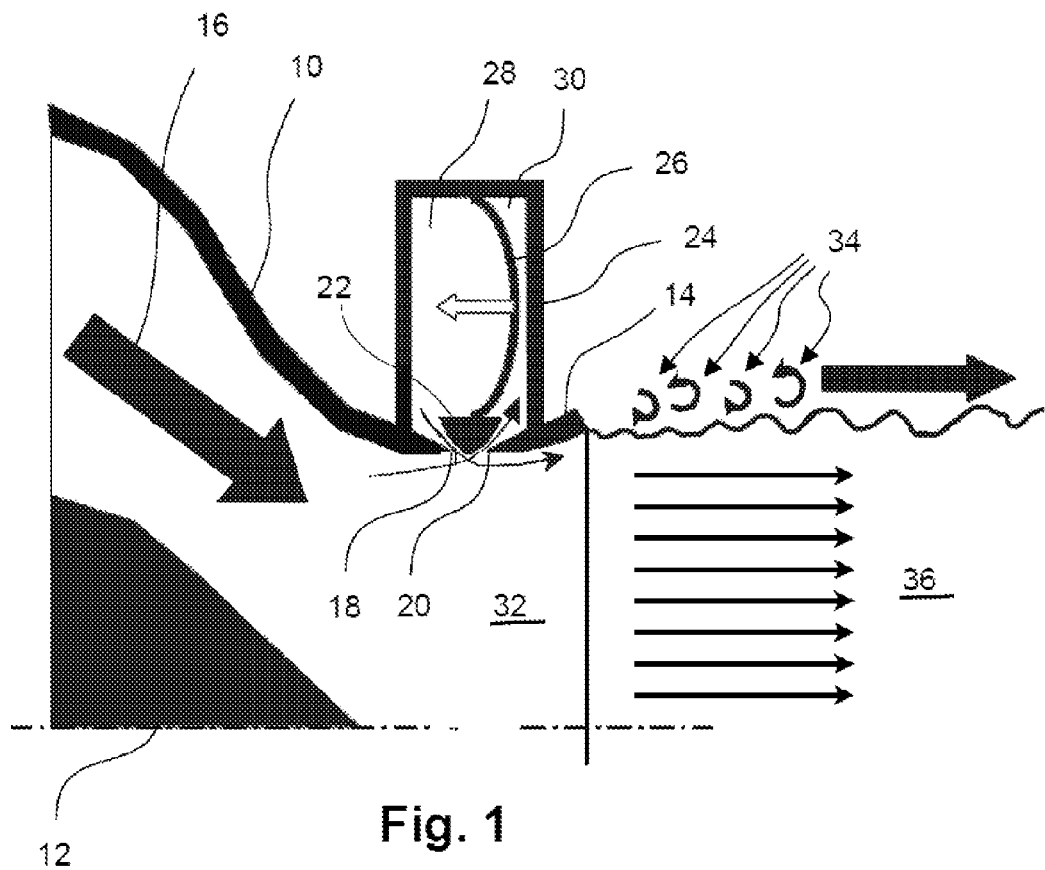
FIG. 1 is a schematic longitudinal sectional view of the exhaust-gas nozzle of an aircraft jet engine in a first state.

The present invention provides an aircraft jet engine of the generic type having reduced noise generation.

In a embodiment, openings that are distributed along the circumference are arranged in the exhaust-gas nozzle upstream from a nozzle outlet, said openings communicating with a device that blows the exhaust gas in and out in a pulsating manner. Blowing exhaust gas in and out in a pulsating manner leads to a flow separation along the entire circumference in front of the nozzle outlet and generates a pulsed turbulence layer around the core jet of the aircraft jet engine, so that this layer moves downstream from the jet (comparable to the rising smoke rings created by a smoker), thereby reducing the level of noise. To put it in illustrative terms, the core jet moves as if it were on ball bearings or roller bearings, whereby the circular "rollers" are formed by the turbulence rings that surround the core jet.

This preferably entails a zero-mass flow, in other words, all of the drawn-in gas is blown out again. As an alternative, in addition to the drawn-in exhaust gas, it is possible to feed in additional gas from the outside and to blow it out, thus giving rise to a non-zero mass flow.

According to an advantageous refinement of the invention, the exhaust-gas nozzle has a front constricting section and a subsequent diffuser section, whereby the openings are arranged in the area of the transition from the constricting section to the diffuser section, in other words, at the place where the cross section is the narrowest. This configuration is the most effective for bringing about the envisaged flow separation.

According to an advantageous refinement of the invention, two rows of openings are arranged axially one behind the other, which are both provided to blow exhaust gas in and out in alternatingly. In this manner, the exhaust gas is blown in and blown out simultaneously.

Preferably, the two rows of openings have different blowing directions. Especially preferably, the front row of openings as seen in the flow direction is configured to blow in and out upstream, while the rear row of openings is configured to blow in and out downstream. In this process, first of all, the front row of openings draws gas in, while, at the same time, the rear row of openings blows gas out opposite to the flow direction. Subsequently, the gas is blown out via the front row of openings as seen in the flow direction.

According to an advantageous refinement of the invention, the openings are configured as slots that are distributed along the circumference. Ideally, there would be an uninterrupted annular gap or two annular gaps arranged one after the other. This, however, gives rise to structural problems when it comes to affixing the downstream diffuser, so that the openings are preferably configured as slots that are interrupted by lengthwise webs which secure the diffuser. As an alternative, the openings can also be configured as a plurality of holes of any desired shape (e.g. round) that are formed in the circumferential direction next to each other in a continuous channel wall.

According to an advantageous refinement of the invention, the device comprises an annular space that surrounds the exhaust-gas outlet channel and that is divided by a partition wall into two annular chambers, each of which communicates with a row of openings, whereby an oscillating movement of the partition wall can alternatingly increase the size of one annular chamber and correspondingly decrease the size of the other annular chamber. This constitutes a structurally simple configuration since the partition wall can be configured in the form of a membrane having two stable end positions. An actuator can then move the partition wall from one end position to the other end position, as a result of which the volume of the one annular chamber increases while the volume of the other annular chamber decreases correspondingly, and vice versa.

As an alternative, it is likewise possible for the device to have two annular chambers, each of which communicates with one of the rows of openings and whose volume can be changed by means of one or more pistons that communicate with the annular chambers on both sides, so that a movement of the at least one piston increases the volume of the one annular chamber while concurrently decreasing the volume of the other annular chamber.

According to an advantageous refinement of the invention, the pulsation frequency lies between 2 Hz and 300 Hz, especially preferably between 10 Hz and 200 Hz. The larger the diameter of the nozzle, the lower the pulsation frequency.

Figure 2:
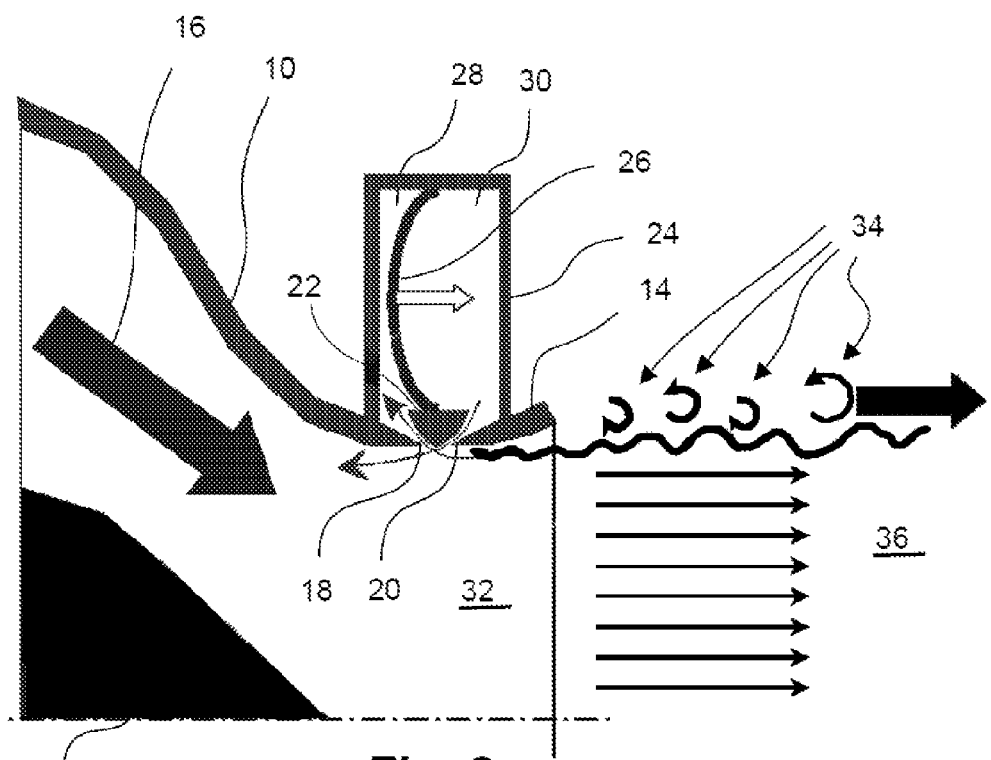
FIG. 2 is a schematic longitudinal sectional view of the exhaust-gas nozzle of an aircraft jet engine in a second state.

FIGS. 1 and 2 show an exhaust-gas nozzle wall 10 of an aircraft jet engine 12, said wall making a transition to a diffuser 14. The nozzle blows out an exhaust-gas stream 16 towards the rear. In the area where the exhaust-gas nozzle wall 10 having a tapering cross section makes the transition to an expanding diffuser 14, there are two rows 18, 20 of openings distributed along the circumference one after the other in the axial direction. These rows 18, 20 of openings preferably consist of several slots which are arranged one after the other in the circumferential direction and which are separated from each other by webs, whereby the diffuser 14 is fastened to the exhaust-gas nozzle wall 10 by the webs. In the embodiment shown, the two rows 18, 20 of openings are formed in that a row of openings having a larger dimension in the axial direction is provided, whereby a ring-shaped spacer 22 is arranged in the center, leaving front and rear slots on both sides in the axial direction. Radially on the outside of the rows 18, 20 of openings, there is a ring-shaped housing 24 that is divided into two annular chambers 28, 30 by means of a membrane-like partition wall 26. Via the rows 18, 20 of openings, these chambers 28, 30 communicate with the exhaust-gas stream 16.

By means of an actuator, the bi-stable partition wall 26 is moved between two end positions. FIG. 1 shows a movement in the axial direction opposite from the direction of flow of the exhaust-gas stream 16—indicated by the arrow—which causes the left side chamber 28 to be decreased in size, whereby the exhaust gas contained in it is blown out via the rows 18, 20 of openings into the nozzle channel 32. In this context, the openings of the row 18 of openings are directed in such a way that the exhaust gas blown out via the row 18 of openings exits in the downstream direction.

At the same time, the second chamber 30 increases during the movement of the partition wall 26, so that exhaust gas is drawn in from the nozzle channel 32 via the row 20 of openings.

FIG. 2 shows the arrangement in a second position in which the partition wall 26 has been moved back again. In this process, gas is blown out of the chamber 30 opposite from the flow direction via the row 20 of openings, while at the same time, the chamber 28, whose volume increases, draws in exhaust gas from the nozzle channel 32 via the row 18 of openings.

The partition wall 26 moves back and forth at a frequency of 2 Hz and 300 Hz, preferably 10 Hz and 200 Hz. This causes the exhaust-gas stream to separate from the wall of the diffuser 14, forming ring-shaped vortices 34 that surround the core jet 36 exiting from the nozzle, so as to generate a pulsed turbulence layer around the core jet 36 of the aircraft jet engine, said layer moving downstream and reducing the level of noise.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 10 exhaust-gas nozzle wall
12 aircraft jet engine
14 diffuser
16 exhaust-gas stream
18 row of openings
20 row of openings
22 spacer
24 housing
26 partition wall
28 chamber
30 chamber
32 nozzle channel
34 vortex
36 core jet

What is claimed is:

1. An aircraft jet engine, comprising:
an exhaust-gas nozzle having a device configured to blow out an exhaust gas in a pulsating manner into an exhaust-gas stream so as to reduce noise, the exhaust-gas nozzle including two rows of openings arranged axially one behind the other and configured to blow the exhaust gas in and out alternatingly, the two rows of openings being distributed along a circumference of the exhaust-gas nozzle and disposed upstream from a nozzle outlet so as to generate a pulsed turbulence layer around the circumference of the exhaust-gas nozzle, the openings communicating with the device;
wherein the device comprises an annular space that surrounds a nozzle channel and that is divided by a partition wall into two annular chambers, each of the two annular chambers communicating with a respective one of the two rows of the openings, the partition wall being configured to move in an oscillating manner so as to alternatingly increase a size of one of the annular chambers and correspondingly decrease a size of the other one of the annular chambers.

2. The aircraft jet engine according to claim 1, wherein the exhaust-gas nozzle has a front constricting section and a subsequent diffuser section, the openings being disposed in an area of a transition from the constricting section to the diffuser section.

3. The aircraft jet engine according to claim 1, wherein the two rows of the openings have different blowing directions from each other.

4. The aircraft jet engine according to claim 3, wherein a front row of the openings as seen in a flow direction is configured to blow in and out upstream of a rear row of the openings that is configured to blow in and out.

5. The aircraft jet engine according to claim 1, wherein the openings are configured as slots that are distributed along the circumference.

6. The aircraft jet engine according to claim 1, wherein the partition wall is a ring-shaped, bi-stable membrane wall.

7. The aircraft jet engine according to claim 1, wherein a pulsation frequency of the device is between 2 Hz and 300 Hz.

8. The aircraft jet engine according to claim 7, wherein the pulsation frequency is between 10 Hz and 200 Hz.

* * * * *